United States Patent [19]
Udocon et al.

[11] Patent Number: 5,215,270
[45] Date of Patent: Jun. 1, 1993

[54] METHOD FOR TIGHTENING A FASTENER

[75] Inventors: David M Udocon, Oakland; John R. Knoche, Utica, both of Mich.

[73] Assignee: Cooper Industries, Inc., Houston, Tex.

[21] Appl. No.: 900,401

[22] Filed: Jun. 18, 1992

[51] Int. Cl.$^5$ ............................................. B23D 19/06
[52] U.S. Cl. .......................................... 29/407; 173/1
[58] Field of Search ...................... 29/407, 525.1, 705; 73/761, 862.23, 862.24; 173/1, 2

[56] References Cited

U.S. PATENT DOCUMENTS

| | | | |
|---|---|---|---|
| 4,104,778 | 8/1978 | Vliet | 29/407 |
| 4,104,779 | 8/1978 | Sigmund | 29/407 |
| 4,283,830 | 8/1981 | Gallizio et al. | 29/407 |
| 4,908,926 | 3/1990 | Takeshima et al. | 29/407 |
| 5,105,519 | 4/1992 | Doniwa | 29/407 |
| 5,125,156 | 6/1992 | Witte | 29/407 X |

*Primary Examiner*—Timothy V. Eley
*Attorney, Agent, or Firm*—Jackie Lee Duke; Eddie E. Scott

[57] ABSTRACT

An improved and novel method for controlling the speed of a mechanical apparatus in relation to a reference parameter. The reference parameter can be torque, displacement or similarly measurable parameters. A preferred implementation of the improved and novel method is used for tightening fasteners which utilizes feedback torque to control the speed and sequence of a fastening tool. This feedback torque is constantly monitored to allow continuous adjustment of the speed of the fastening tool and thereby control the torque applied to the fastener. The method is implemented on a fastening tool used to tighten a retainer nut on a pinion gear shaft supported by bearings in a differential housing. The speed of a fastening tool is continuously monitored and changed in response to a rotational torque measurement taken from the pinion gear shaft and bearing assembly. As the rotational torque value of the pinion gear shaft and bearing assembly approaches a final preselected value the speed of the fastening tool is slowed to ensure the retainer nut is not over tightened.

13 Claims, 6 Drawing Sheets

METHOD FOR TIGHTENING A FASTENER

BACKGROUND

This invention relates to an improved method for tightening fasteners which utilizes feedback torque to continuously control the speed and sequence of a fastening tool. This feedback torque is constantly monitored to allow continuous adjustment of the speed of the fastening tool and thereby control the torque applied to the fastener. This method is particularly suited for fastening tools used on fasteners that are required to be fastened within a specific tolerance within a specific time frame. Continuously adjusting the speed of the fastening tool allows a means to optimize the cycle time for fastening.

Typically when tightening fasteners, especially preload setting fasteners, the torque builds rapidly as the fastener approaches its final desired value. Prior fastening tools have been run at a constant speed which often leads to over tightening or exceeding the target torque. This target torque overshoot is a result of the response time of the system controlling the fastening tool along with the speed at which the fastener is tightened. One possible solution has been to use a low speed fastening tool which reduces the overshoot problem, but the time required to tighten a given fastener becomes excessively long.

A more common prior solution has been to use a torque feedback fastening strategy which utilizes a constant speed motor for operating the fastening tool with the addition of a clutch mechanism or reducer gear arrangement which allows modification of the speed of the fastening tool. In most cases these additions allow a two speed or stage operation of the fastening tool. The first stage tightens the fastener at a fast speed to a torque level lower than the desired final torque. The clutch mechanism or reducer gear arrangement is then engaged to start the second stage of tightening. The second stage tightens at a lower speed to allow more accurate control of the fastening tool as the fastener torque approaches the desired final value.

This two stage fastening strategy works well on "soft" joints, i.e., those joints where the joint members have a low spring constant and therefore a high elasticity. Problems arise however when this same two stage strategy is applied to "hard" joints, i.e., those joints where the joint members have a high spring constant and therefore a low elasticity, such as in bearing preload applications. The two major problems encountered in these situations are overshooting the desired torque value and an increased cycle time. The torque overshoot results when the second stage speed is too fast to allow accurate control of the fastening tool. The increased cycle time is usually a result of the torque transducer seeing a premature high torque reading and shifting to the lower fastening speed or shutting off. This can occur when the fastener encounters a burr on the thread as it is tightened which cause a momentary spike in the torque reading which causes the system to shift the fastening tool to its slower speed. The present invention overcomes these problems by providing a novel method for tightening fasteners which utilizes feedback torque to continuously monitor and control the speed of a fastening tool.

U.S. Pat. No. 5,105,519 to Doniwa shows a tension control method for a nutrunner which measures the torque on a fastener at two different angular positions and calculates the ratio of the two values to determine a resultant tension in the fastener which is used to control the starting and stopping of the nutrunner.

SUMMARY

An improved and novel method for tightening fasteners which utilizes feedback torque to control the speed and sequence of a fastening tool. This feedback torque is constantly monitored to allow continuous adjustment of the speed of the fastening tool and thereby control the torque applied to the fastener. The method is implemented on a fastening tool used to tighten a retainer nut on a pinion gear shaft supported by bearings in a differential housing. The speed of an electric fastening tool is continuously monitored and changed in response to a rotational torque measurement taken from the pinion gear shaft and bearing assembly. As the rotational torque value of the pinion gear shaft and bearing assembly approaches a final preselected value the speed of the fastening tool is slowed to ensure the retainer nut is not over tightened.

An object of the present invention is to provide an improved method for tightening fasteners which utilizes feedback torque to continuously control the speed and sequence of a fastening tool.

Another object of the present invention is to provide an improved method for tightening fasteners which minimizes the chance of overshooting the desired final torque for a fastener.

A further object of the present invention is to provide an improved method for tightening fasteners which decreases the time required to tighten fasteners by optimizing the speed at which the fastening tool is operated.

An advantage of the present invention is the ability to continuously modify the fastening tool's speed to reduce the occurrence of torque overshoot while decreasing tightening time.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
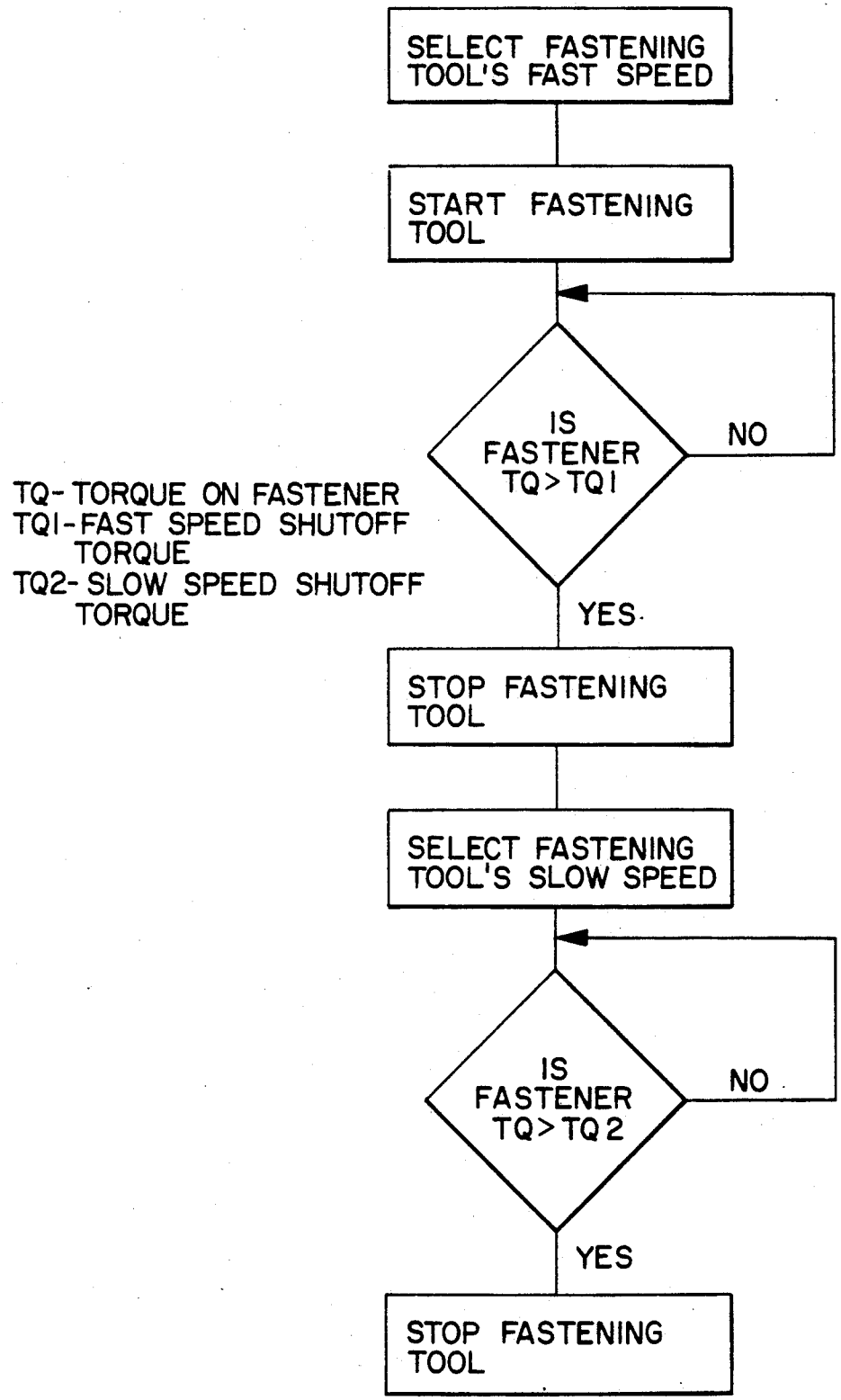
FIG. 1 is a flow chart showing the steps required in prior art fastening methods using a two stage tightening sequence.

The flow chart of FIG. 1 shows the steps involved in operating a prior fastening tool with a clutch mechanism or reducer gear arrangement which utilizes a two stage tightening sequence. The fastening tool is initially operated at fast speed until the torque on the fastener, denoted by TQ, reaches a preselected shutoff torque value, TQ1. The fastening tool is then stopped, the fastening tool slow speed is selected and the fastening tool restarted and operated until TQ reaches the desired torque TQ2.

Figure 2:
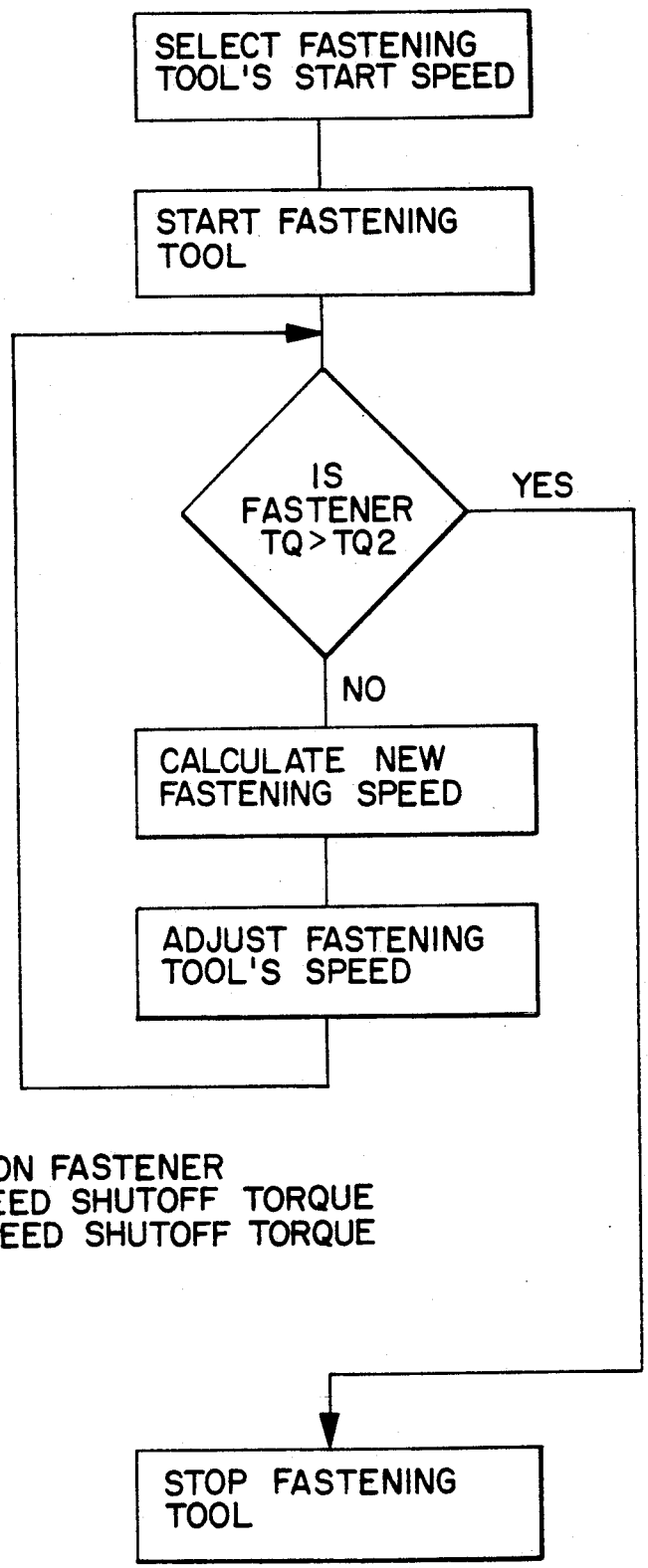
FIG. 2 is a flow chart showing the steps required in the fastening method of the current invention.

The flow chart of FIG. 2 is a simplified diagram showing the logic which controls the operational sequence in applicants' improved method for tightening a fastener. In this new method, the torque TQ on the fastener is monitored continuously and the speed of the fastening tool adjusted accordingly. Should torque TQ exceed the shutoff value for fast speed operation, TQ1, the tool's speed is adjusted to a lower speed. Should torque TQ fall below TQ1, the tool's speed is adjusted to a higher speed. Once TQ reaches the desired final torque TQ2, the tool is stopped.

The calculation of the optimum speed for the fastening tool is performed in accordance with the following equation: $(K_1/X^2) + K_2 = RPM$, where $K_1$ = Empirical constant determined by characteristics of joint to be fastened,
$K_2$ = Empirical constant determined by characteristics of fastening tool used,
X = Torque to be monitored to determined fastening tool speed, and
RPM = Speed of fastening tool.

The empirical constants $K_1$ and $K_2$ are determined for each combination of joint and fastening tool to be controlled. It should also be noted the above described equation is a speed equation and may be of a different form for different fastening operations.

Figure 5A:
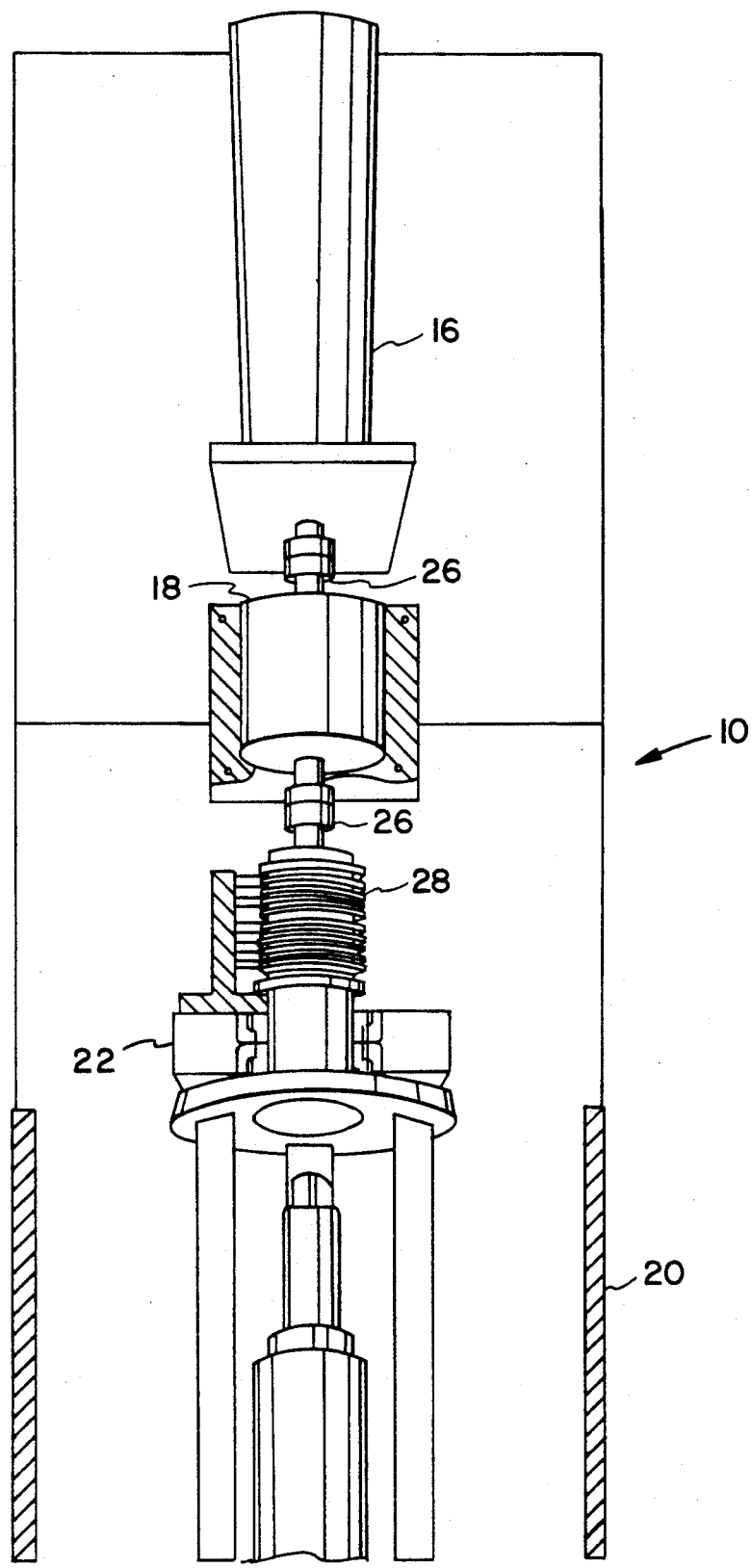
FIG. 5 is an elevational view, partly in section, which shows a fastening tool which implements the improved method of the present invention with FIG. 5A being the upper portion and FIG. 5B being the lower portion thereof.
Figure 5B:
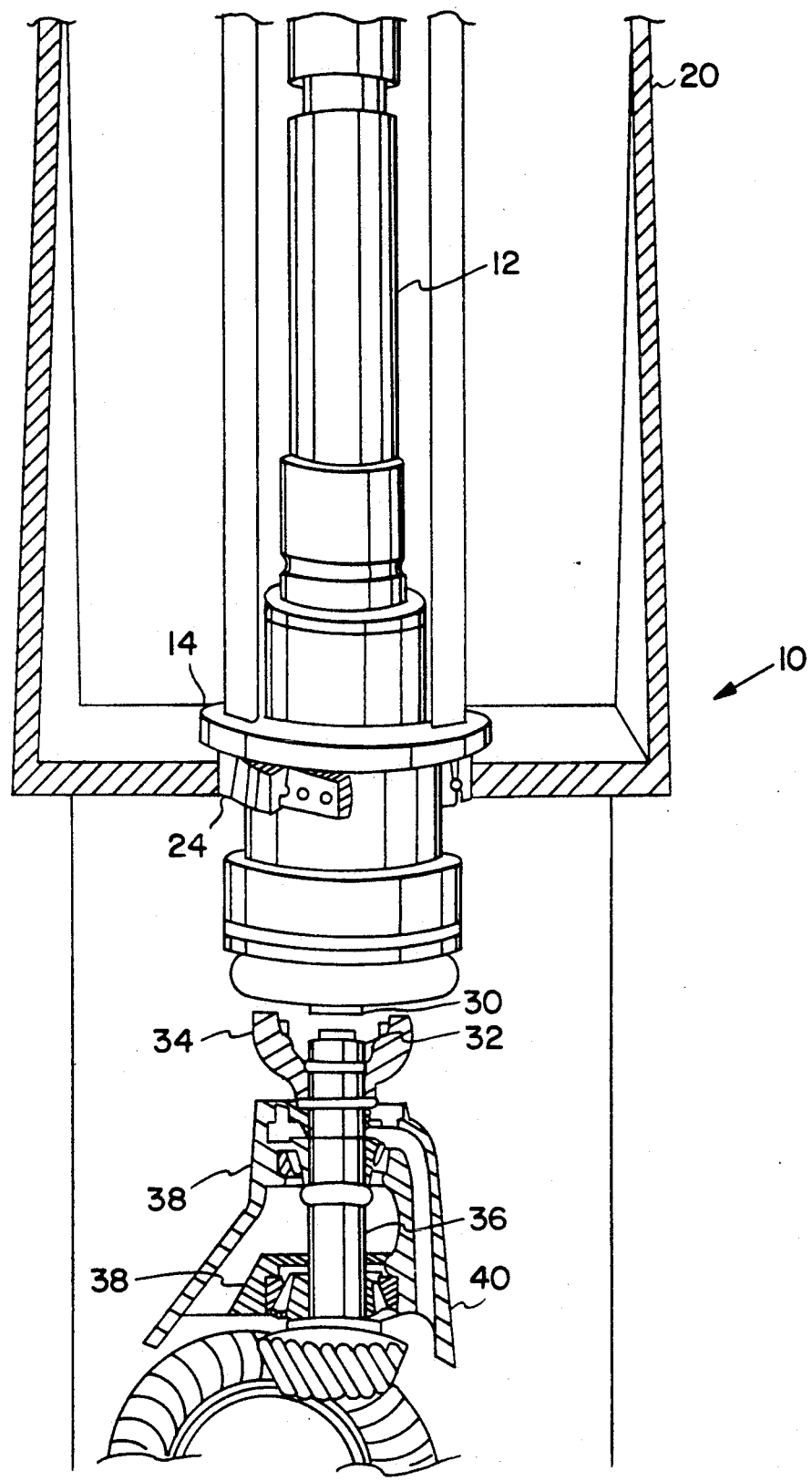

A fastening tool which implements the improved method of the present invention is shown in FIG. 5. The tool, denoted generally by numeral 10, is comprised of electric nutrunner 12, nut driver carriage 14, and carriage drive motor 16, preload transducer 18, and carrier frame 20. Nutrunner 12 is mounted on nut driver carriage 14 which is supported on thrust bearings 22 and 24 and allows carriage 14 to rotate within carrier frame 20. Carriage driver motor 16 is mounted on carrier frame 20 above nut driver carriage 14 and rotates nut driver carriage 14 through shaft 26. Shaft 26 extends downwardly through preload transducer 18 which is also mounted on carrier frame 20. A slip ring or collector assembly 28 completes the connection between shaft 26 and nut driver carriage 14 thereby allowing carriage drive motor 16 to rotate nut driver carriage 14. Collector assembly 28 supplies electrical power to nutrunner 12 and allows it to rotate its spindle 30 independently of nut driver carriage 14 and tighten fasteners.

Carrier frame 20 is vertically movable on an outer tool frame (not shown) by suitable means well known to those skilled in the art. Nut 32 holds yoke 34 in position on pinion shaft 36 which is supported by bearings 38 within differential housing 40, shown partly in section. Differential housing 40 is clamped on the outer tool frame.

Figure 3:
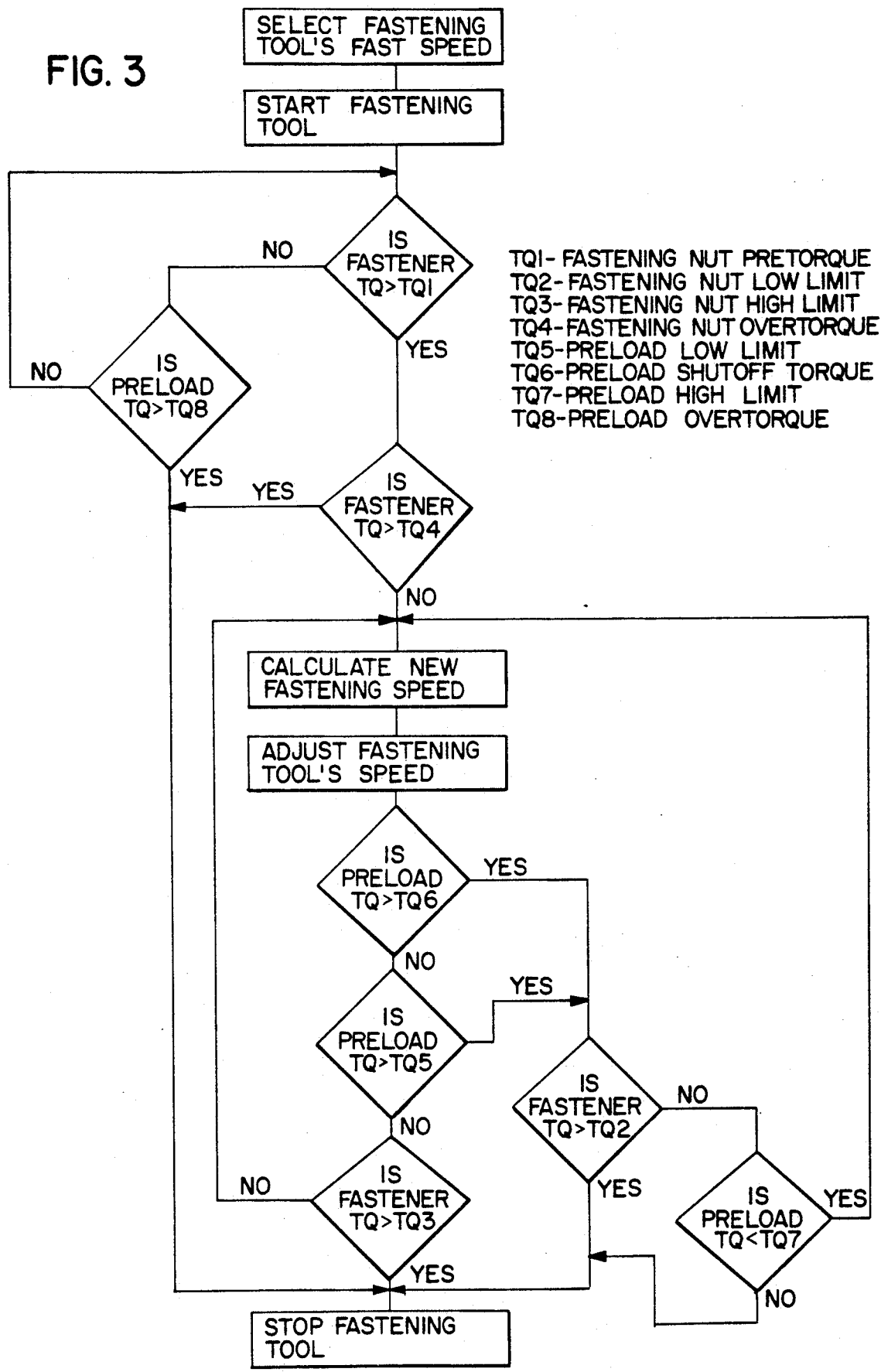
FIG. 3 is a flow chart showing the steps required in the fastening method of the current invention applied to the fastening tool shown in FIG. 5.

The flow chart of FIG. 3 shows the logic sequence followed for the fastening tool shown in FIG. 5. The carriage drive motor 16 is started and a reading of the preload torque on pinion shaft 36 and bearings 38 is established by measuring the rotational torque through preload transducer 18. Electric nutrunner 12 is then operated to begin tightening nut 32. The preload torque is continuously monitored and adjustments to the speed of nutrunner 12 are made as required to ensure nut 32 is tightened to the desired torque without overshooting the desired final value.

Figure 4:
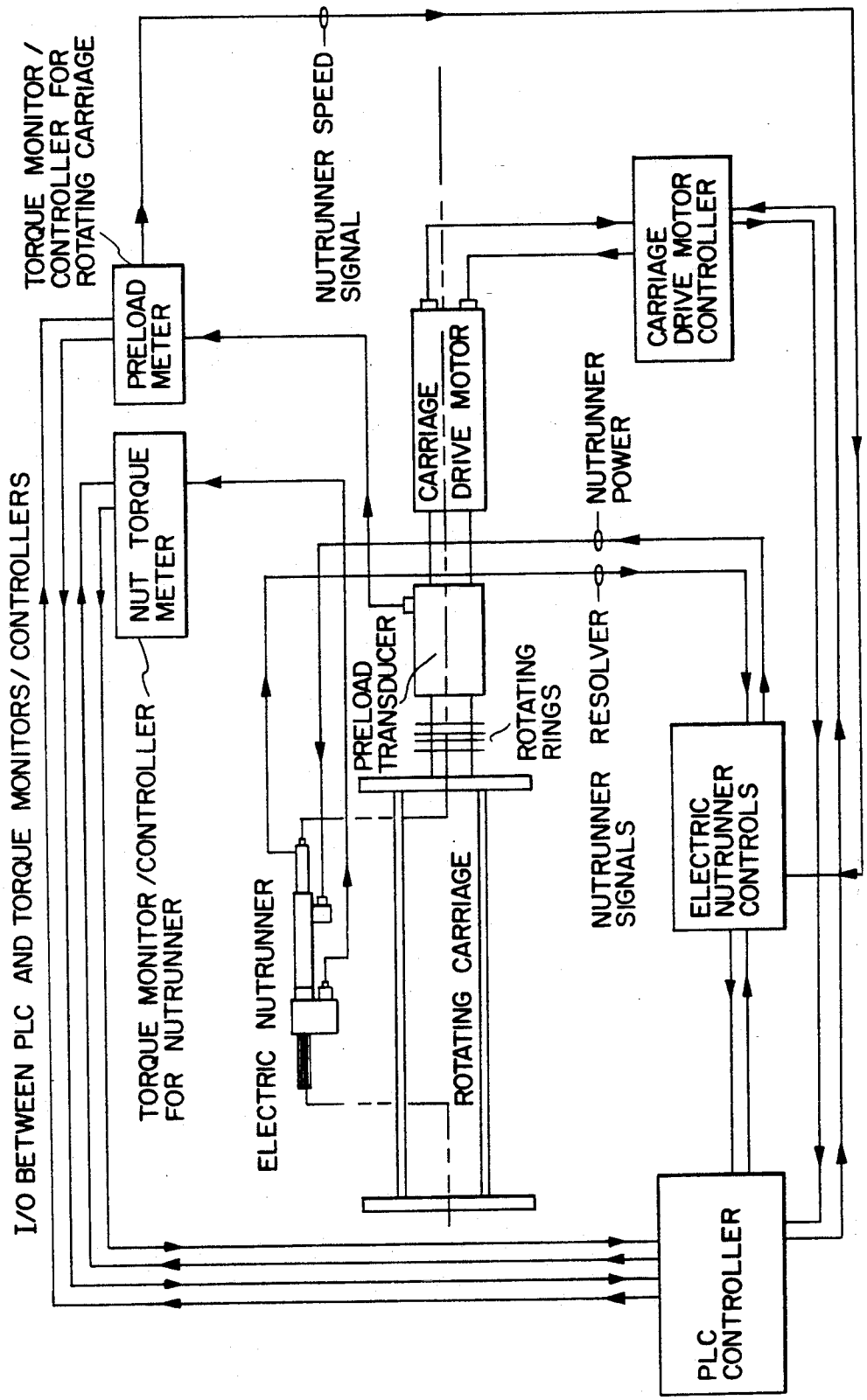
FIG. 4 is a block diagram showing the interconnection of the components of the fastening tool in FIG. 5.

The block diagram of FIG. 4 shows the components and circuitry required to operate the tool of FIG. 5. The initial stop and start controls of the nutrunner 12 and carriage drive motor 16 are done by the programmable logic controller or PLC. The PLC sends signals to the carriage drive motor controller which in turns starts the carriage drive motor. The preload transducer 18 sends a signal to the preload meter or torque monitor and controller for the nut driver carriage 14. This torque monitor and controller is of the programmable type well known to those skilled in the art. An example of this torque monitor and controller is the Daytronics Model 4077 manufactured by Daytronics. This preload meter signals the PLC and nutrunner control unit to start the nutrunner 12. As the torque applied by the nutrunner to the fastener increases, a transducer on the nutrunner measures this torque and sends a signal to the nut torque meter or torque monitor and controller for the fastener being tightened. This torque monitor and controller is the same as that used for the nut driver carriage. This nut torque meter also signals the PLC and electric nutrunner controls to stop the nutrunner should an over torque situation occur. The preload torque monitor also sends a signal to the electric nutrunner to make appropriate corrections in speed. Once the proper nut torque and preload torque are obtained, signals are sent to the PLC which turns off the carriage drive motor and nutrunner.

The use of our improved method of tightening a fastener and the methods of its application will be readily understood from the foregoing description and it will be seen we have provided an improved method of tightening a fastener which has the ability to continuously modify a fastening tool's speed to rotate the occurrence of torque overshoot while decreasing tightening time. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method of controlling the position and speed of a mechanical apparatus comprising the steps of:
    (a) positioning a mechanical apparatus between a first and a second position,
    (b) measuring a reference parameter of said mechanical apparatus as said mechanical apparatus is urged between said first position and said second position,
    (c) comparing said reference parameter to a predetermined value to determine an optimum functioning speed for said mechanical apparatus,
    (d) adjusting the functioning speed of said mechanical apparatus in response to said comparison to maintain said mechanical apparatus at said optimum functioning speed, and
    (e) continuously repeating steps b-d until the mechanical apparatus is moved between said first position and said second position.

2. A method of tightening a fastener comprising the steps of:
    (a) positioning a fastening tool on a fastener,
    (b) measuring a reference parameter of said fastener as the fastening tool tightens the fastener,
    (c) comparing said reference parameter to a predetermined value to determine an optimum operating speed for said fastening tool, (d) adjusting the operating speed of said fastening tool in response to said comparison to maintain said fastening tool at said optimum operating speed, and (e) continuously repeating steps b-d until the fastener is tightened such that said reference parameter is within a preselected range.

3. A method of tightening a fastener according to claim 2 wherein said reference parameter is torque of said fastener.

4. A method of tightening a fastener according to claim 2 wherein said reference parameter is displacement of said fastener.

5. A method of tightening a fastener according to claim 2 wherein said comparison is done by evaluating a parametric equation based on said fastener and fastening tool characteristics.

6. A method of tightening a fastener comprising the steps of:

(a) positioning a fastening tool on a fastener, (b) measuring the torque of said fastener as the fastening tool tightens the fastener, (c) comparing said torque measurement to a predetermined value to determine an optimum operating speed for said fastening tool, (d) adjusting the operating speed of said fastening tool in response to said comparison to maintain said fastening tool at said optimum operating speed, and (e) continuously repeating steps b-d until the fastener is tightened to a torque within a preselected range.

7. A method of tightening a fastener according to claim 6 wherein said optimum operating speed for said fastening tool is determined substantially in accordance with the equation $(K_1/X^2)+K_2=RPM$, wherein $K_1$=an empirical constant determined by characteristics of the joint to be fastener, $K_2$=an empirical constant determined by the characteristics of said fastening tool, X=torque to be monitored to determine said fastening tool's speed, and RPM=the speed of said fastening tool.

8. A method of tightening a fastener comprising the steps of:

(a) positioning a fastening tool on a fastener, (b) measuring the torque of said fastener as the fastening tool tightens the fastener, (c) inputting said torque measurement to a torque monitor and controller, (d) comparing said torque measurement to a predetermined value with said torque monitor and controller to determine an optimum operating speed for said fastening tool, (e) adjusting the speed of said fastening tool in response to the output of said torque monitor and controller to maintain said fastening tool at said optimum operating speed, and (f) continuously repeating steps b-e until the fastener is tightened to a torque within a preselected range.

9. A method of tightening a fastener according to claim 8 wherein said optimum operating speed for said fastening tool is determined substantially in accordance with the equation $(K_1/X^2)+K_2=RPM$, wherein $K_1$=an empirical constant determined by characteristics of the joint to be fastened, $K_2$=an empirical constant determined by the characteristics of said fastening tool, X=torque to be monitored to determine said fastening tool's speed, and RPM=the speed of said fastening tool.

10. A method of tightening a fastener comprising the steps of:

(a) positioning a fastening tool on a fastener disposed on a shaft supported on bearings and extending from a housing, (b) measuring the torque of said shaft and bearings and the torque of said fastener as the fastening tool tightens the fastener, (c) comparing said shaft and bearing torque measurement and said fastener torque measurement to predetermined values to determine an optimum operating speed for said fastening tool, (d) adjusting the speed of said fastening tool in response to said comparisons to maintain said fastening tool at said optimum operating speed, and (e) continuously repeating steps b-d until the fastener is tightened to a torque within a preselected range.

11. A method of tightening a fastener according to claim 10 wherein said optimum operating speed for said fastening tool is determined substantially in accordance with the equation $(K_1/X^2)+K_2=RPM$, wherein $K_1$=an empirical constant determined by characteristics of the joint to be fastened, $K_2$=an empirical constant determined by the characteristics of said fastening tool, X=torque to be monitored to determine said fastening tool's speed, and RPM=the speed of said fastening tool.

12. A method of tightening a fastener comprising the steps of:

(a) positioning a fastening tool on a fastener disposed on a shaft supported on bearings and extending from a housing, (b) measuring the torque of said shaft and bearings and the torque of said fastener as the fastening tool tightens the fastener, (c) inputting said shaft and bearing torque measurement and said fastener torque measurement to a torque monitor and controller, (d) comparing said shaft and bearing torque measurement and said fastener torque measurement to predetermined values with said torque monitor and controller to determine an optimum operating speed for said fastening tool, (e) adjusting the operating speed of said fastening tool in response to the comparisons of said torque monitor and controller to maintain said fastening tool at said optimum operating speed, and (f) continuously repeating steps b-e until the fastener is tightened to a torque within a preselected range.

13. A method of tightening a fastener according to claim 12 wherein said optimum operating speed for said fastening tool is determined substantially in accordance with the equation $(K_1/X^2)+K_2=RPM$, wherein $K_1$=an empirical constant determined by characteristics of the joint to be fastened, $K_2$=an empirical constant determined by the characteristics of said fastening tool, X=torque to be monitored to determine said fastening tool's speed, and RPM=the speed of said fastening tool.

* * * * *